(12) United States Patent
Lu et al.

(10) Patent No.: US 11,835,757 B2
(45) Date of Patent: Dec. 5, 2023

(54) OPTOELECTRONIC PACKAGE AND METHOD FOR MANUFACTURING THE SAME

(71) Applicant: Advanced Semiconductor Engineering, Inc., Kaohsiung (TW)

(72) Inventors: Mei-Ju Lu, Kaohsiung (TW); Jr-Wei Lin, Kaohsiung (TW); Chang-Feng You, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 120 days.

(21) Appl. No.: 17/492,491

(22) Filed: Oct. 1, 2021

(65) Prior Publication Data

US 2023/0105803 A1 Apr. 6, 2023

(51) Int. Cl.
*G02B 6/12* (2006.01)
*G02B 6/42* (2006.01)

(52) U.S. Cl.
CPC ........ *G02B 6/12004* (2013.01); *G02B 6/4203* (2013.01); *G02B 2006/12121* (2013.01)

(58) Field of Classification Search
CPC ...... G02B 6/12004; G02B 2006/12121; G02B 6/4203
See application file for complete search history.

(56) References Cited

U.S. PATENT DOCUMENTS

| | | | | |
|---|---|---|---|---|
| 8,488,920 B2* | 7/2013 | Pitwon | ................. | H05K 1/0274 |
| | | | | 359/341.3 |
| 9,325,146 B2* | 4/2016 | Pitwon | ................. | H05K 1/0274 |
| 9,857,532 B2 | 1/2018 | Chin et al. | | |
| 10,598,875 B2* | 3/2020 | Xie | ....................... | G02B 6/3897 |
| 2012/0051688 A1* | 3/2012 | Pitwon | ................... | H01S 3/178 |
| | | | | 359/341.32 |
| 2022/0413210 A1* | 12/2022 | Liu | .................... | G02B 6/12004 |

OTHER PUBLICATIONS

U.S. Appl. No. 16/988,325, filed Aug. 7, 2020, Chuang et al.

* cited by examiner

*Primary Examiner* — Ryan A Lepisto
*Assistant Examiner* — Erin D Chiem
(74) *Attorney, Agent, or Firm* — FOLEY & LARDNER LLP

(57) ABSTRACT

An optoelectronic package is provided. The optoelectronic package includes a photonic component. The photonic component has a bottom surface and a lateral surface. The lateral surface of the photonic component includes a light coupling region and a non-light coupling plane. The non-light coupling plane contacts the bottom surface. The light coupling region and the non-light coupling plane are not aligned.

9 Claims, 16 Drawing Sheets

OPTOELECTRONIC PACKAGE AND METHOD FOR MANUFACTURING THE SAME

FIELD OF THE DISCLOSURE

The present disclosure relates to an optoelectronic package, and particularly to an optoelectronic package including a photonic component having a light coupling region. The present disclosure also relates to a method for manufacturing the optoelectronic package.

DESCRIPTION OF THE RELATED ART

A waveguide of a photonic component has an exposed surface so as to optically couple with an optical component, such as a laser diode or an optical fiber or optical fiber array unit. The roughness of the exposed surface may affect the efficiency of light coupling; so it is desirable to have a relatively smooth exposed surface to improve the efficiency of light coupling. However, current singulation operations cannot achieve both a smooth exposed surface and a high yield. For example, when a cutting operation is performed to cut the working piece to form the photonic components, chipping may occur at the exposed surface of the waveguide, causing a coupling loss of signal transmission.

SUMMARY

In some embodiments, an optoelectronic package includes a photonic component. The photonic component has a bottom surface and a lateral surface. The lateral surface of the photonic component includes a light coupling region and a non-light coupling plane. The non-light coupling plane contacts the bottom surface and the light coupling region. The non-light coupling plane are not aligned.

In some embodiments, an optoelectronic package includes a photonic component. The photonic component has a lateral surface. The lateral surface includes a light coupling region and a non-light coupling region. The light coupling region has a first roughness and the non-light coupling region has a second roughness greater than the first roughness of the light coupling region.

In some embodiments, an optoelectronic package includes a supportive component and a photonic component. The supportive component is configured to support an optical component. The photonic component is disposed on the supportive component and has a lateral surface. The lateral surface includes a light coupling region configured to optically couple with the optical component and a non-light coupling region. The light coupling region and the non-light coupling region are not aligned.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
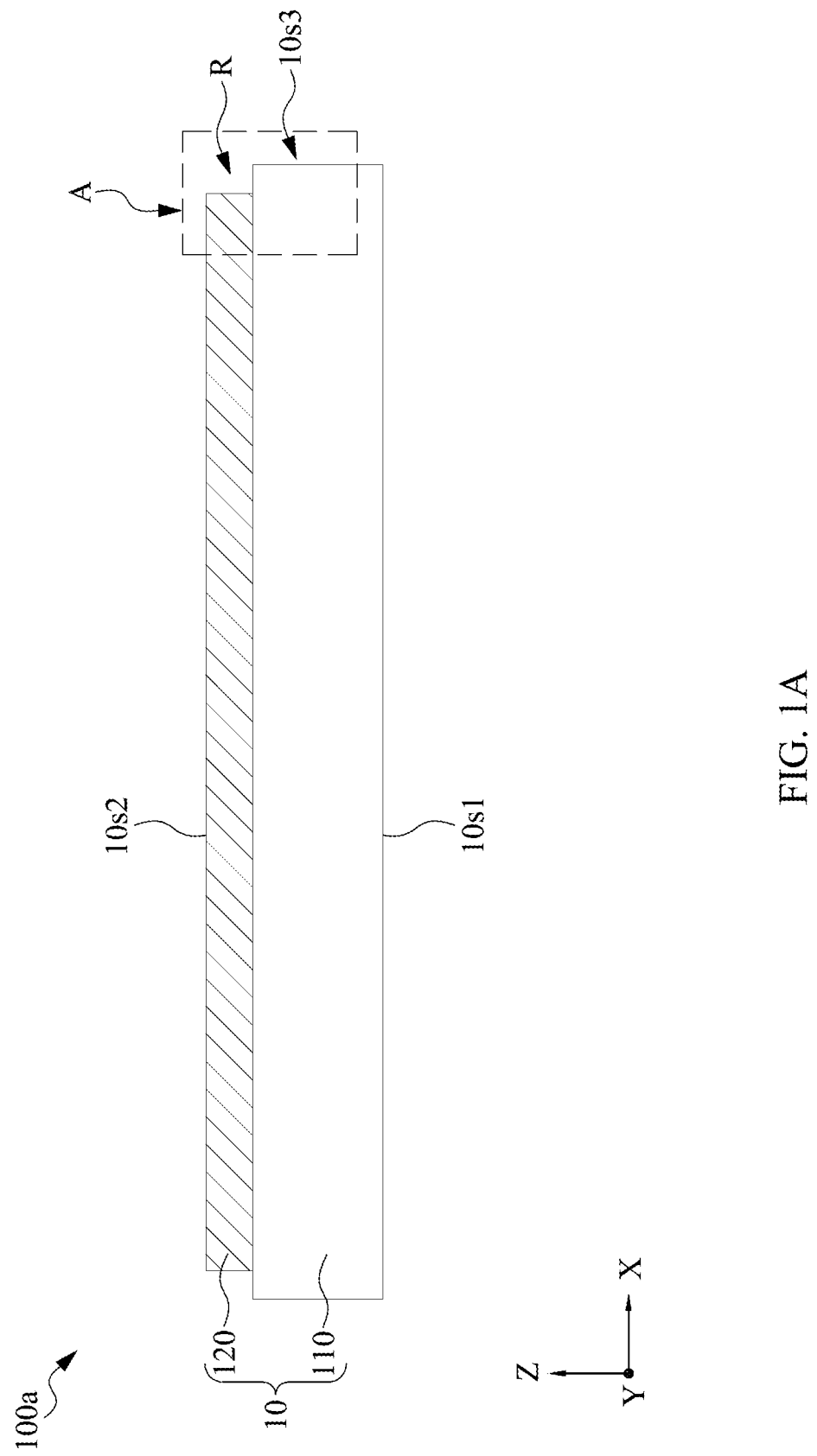
FIG. 1A illustrates a cross-sectional view of an example of an optoelectronic package according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein the term "active surface" may refer to a surface of an electronic component or passive element on which contact terminals such as contact pads are disposed. The term "active surface" may also refer to a surface of a photonic component along which a waveguide is disposed, and the waveguide may be disposed adjacent to the active surface.

FIG. 1A illustrates a cross-sectional view of an example of an optoelectronic package 100a according to some embodiments of the present disclosure.

In some embodiments, the optoelectronic package 100a includes a photonic component 10. The photonic component 10 can be configured to process, receive, and/or transmit optical signals. The photonic component 10 can convert the optical signals to electric signals or convert the electric signals to optical signals. The photonic component 10 can include, but is not limited to, a photonic integrated circuit (PIC).

The photonic component 10 may include a base substrate (or carrier) 110 and a light coupling structure 120. The photonic component 10 may have surfaces 10s1, 10s2, and 10s3. The surface 10s1 (or a bottom surface) is opposite to the surface 10s2 and the surface 10s3 is a lateral surface connecting the surface 10s1 and the surface 10s2. The surface 10s1 may be located at a side of the base substrate 110, and may be defined as a backside surface or inactive surface of the photonic component 10. The surface 10s2 may be located at an active surface of the photonic component 10 and adjacent to a side of the light coupling structure 120. The surface 10s3 (or a lateral surface) may extend between the surface 10s1 and the surface 10s2.

The base substrate 110 may include a semiconductor substrate. The base substrate 110 may include silicon (Si) or germanium (Ge) in a single crystal form, a polycrystalline form, or an amorphous form. Although not shown in FIG. 1A, the photonic component 10 may include one or more active elements, passive elements, and conductive traces disposed therein. The active element may include a transistor, diode, or other active elements. The transistor may include bipolar junction transistor, metal-oxide-semiconductor field-effect transistor (MOSFET), junction gate field-effect transistor (JFET) and other transistors. The diode may include Zener diode, photodiode, Schottky diode and other diodes. The passive element may include a capacitor, resistor, inductor or other suitable passive elements.

The light coupling structure 120 may be disposed on the base substrate 110. The light coupling structure 120 may be configured to receive and transmit optical signals (e.g., light). The light coupling structure 120 may include, for example, a waveguide. In some embodiments, the photonic component 10 may include a recess R. The recess R may be located at a peripheral region of the photonic component 10. In some embodiments, the recess R may be defined by the base substrate 110 and the light coupling structure 120. Although FIG. 1A illustrates that most of the area of the base substrate 110 is covered by the light coupling structure 120, it should be noted that the size of the light coupling structure 120 can be adjusted based on requirements. For example, in some embodiments, the light coupling structure 120 may cover merely the right portion (or right side) of the base substrate 110. Some elements, such as conductive terminals, may be disposed on the uncovered portion of the base substrate 110.

Figure 1B:
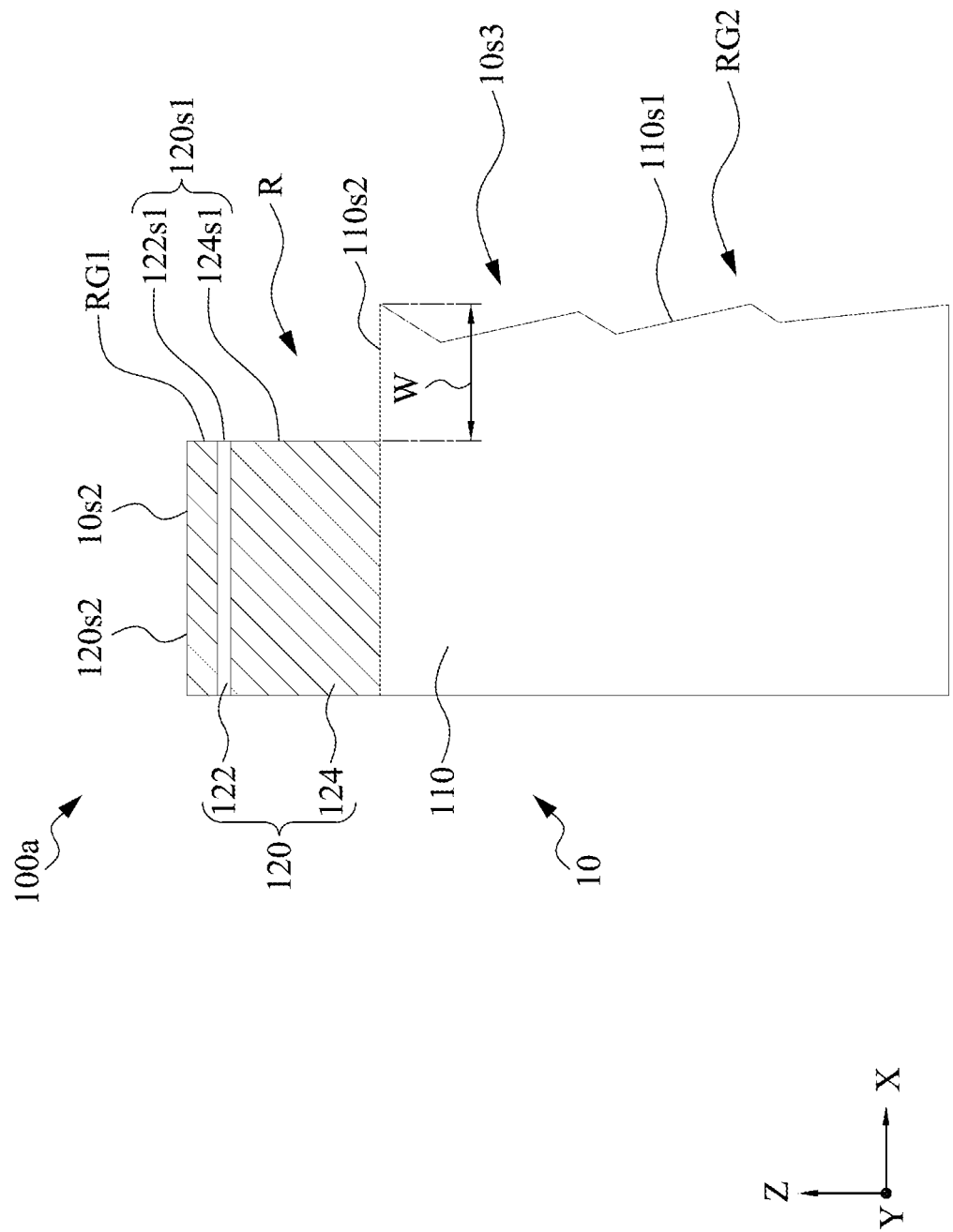
FIG. 1B illustrates a partial enlarged view of an example of the optoelectronic package of FIG. 1A according to some embodiments of the present disclosure.

FIG. 1B illustrates a partial enlarged view of region A of the optoelectronic package 100a of FIG. 1A according to some embodiments of the present disclosure.

The base substrate 110 may have a surface 110s1 (or a lateral surface) and a surface 110s2 (or an upper surface). The light coupling structure 120 may be disposed on the surface 110s2 of the base substrate 110. In some embodiments, a portion of the surface 110s2 is exposed from the light coupling structure 120 and adjacent to the surface 10s3 of the photonic component 10.

The light coupling structure 120 may have a surface 120s1 (or a lateral surface) and a surface 120s2 (or an upper surface). In some embodiments, the light coupling structure 120 may include an optical channel 122 and a cladding layer 124. The cladding layer 124 may be disposed around the optical channel 122. The optical channel 122 may be embedded in the cladding layer 124. In some embodiments, the lateral surface 122s1 of the optical channel 122 may be exposed from the cladding layer 124. The optical channel 122 may be configured to receive and transmit optical signals (e.g., lights) through the lateral surface 122s1. The material of the optical channel 122 is different from that of the cladding layer 124. In some embodiments, the refractive index of the material of the optical channel 122 may be greater than that of the cladding layer 124. In some embodiments, the refractive index of the material of the base substrate 110 may be greater than that of the cladding layer 124. In some embodiments, the material of the optical channel 122 may be the same as or similar to that of the base substrate 110. The optical channel 122 may include a semiconductor material. For example, the optical channel 122 may include or be composed of silicon, silicon nitride, or other suitable materials.

The cladding layer 124 may surround the optical channel 122. The cladding layer 124 may be in contact with the surface 110s2 of the base substrate 110. The cladding layer 124 may include or be composed of oxide, such as silicon oxide ($SiO_2$), yttrium oxide ($Y_2O_3$), aluminum oxide or other suitable materials.

In some embodiments, the surface 10s3 of the photonic component 10 may include a light coupling region RG1 and a non-light coupling region (or a non-light coupling plane) RG2. In some embodiments, the non-light coupling region RG2 may be adjacent to the light coupling region RG1. In some embodiments, the light coupling region RG1 may be defined as a region configured to be coupled with an optical component (e.g., the optical component 30 shown in FIG. 3A and FIG. 3B) so as to receive optical signals from the optical component or transmit optical signals to the optical component; the non-light coupling region RG2 may be defined as a region which is not configured to be coupled with an optical component. In some embodiments, the non-light coupling region (or a non-light coupling plane) RG2 may contact the surface 10s1 of the photonic component 10 shown in FIG. 1A. In some embodiments, the non-light coupling region (or a non-light coupling plane) RG2 may be connected to the surface 10s1 of the photonic component 10 shown in FIG. 1A.

In some embodiments, the light coupling region RG1 may include the optical channel 122 and the cladding layer 124 of the channel 122 which are exposed from the surface 10s3 of the photonic component 10. The light coupling region RG1 is closer to the surface 10s1 of the photonic component 10 than the non-light coupling region RG2. In some embodiments, the light coupling region RG1 may include or be composed of the surface 120s1 of the light coupling structure 120, which includes the lateral surfaces (122s1 and 124s1) of the optical channel 122 and the cladding layer 124. In some embodiments, the surface 120s1 of the light coupling structure 120 constitutes the light coupling region RG1. In some embodiments, the lateral surface 122s1 of the optical channel 122 may be substantially coplanar with the lateral surface 124s1 of the cladding layer 124. In some embodiments, the roughness of the lateral surface 122s1 of the optical channel 122 is substantially the same as the roughness of the lateral surface 124s1 of the cladding layer 124.

In some embodiments, the non-light coupling region RG2 may include the base substrate 110 which is exposed from the surface 10s3 of the photonic component 10. In some embodiments, the non-light coupling region RG2 may include or be composed of the surface 110s1 of the base substrate 110. In some embodiments, the surface 110s1 of the base substrate 110 constitutes the non-light coupling region RG2. In some embodiments, the light coupling region RG1 and the non-light coupling region RG2 may be non-coplanar or not aligned. In some embodiments, the light coupling region RG1 may be recessed from the surface 10s3 of the photonic component 10 or located at the recess R. An exposed portion of the surface 110s2 of the base substrate 110 may extend between the light coupling region RG1 and the non-light coupling region RG2. In some embodiments, a distance between the light coupling region RG1 and the non-light coupling region RG2 (or a width W of the recess R in the x-direction of FIG. 1B) may range from about 10 μm to about 500 μm, such as 10 μm, 15 μm, 30 μm, 50 μm, 100 μm, 300 μm or 500 μm.

In some embodiments, the roughness of the light coupling region RG1 may be different from the roughness of the non-light coupling region RG2. In some embodiments, the roughness of the light coupling region RG1 may be less than the roughness of the non-light coupling region RG2. In some embodiments, the mean roughness depth (Rz) of the light coupling region RG1 is less than the mean roughness depth (Rz) of the non-light coupling region RG2. The mean roughness depth may be defined as, for example, a mean horizontal distance (in this cross-section) obtained by measuring a distance between the lowest valley and the highest peak from five sampling lengths of the surface and then obtaining a mean value of them. In some embodiments, the mean roughness depth of the non-light coupling region RG2 may range from about 5 μm to about 50 μm, such as 5 μm, 10 μm, 15 μm, 30 μm or 50 μm. In some embodiments, a distance between the surface 120s1 of the light coupling structure 120 and the surface 110s1 of the base substrate 110 (or a width W of the recess R in the x-direction of FIG. 1B) is greater than the mean roughness depth of the surface 110s1 of the base substrate 110.

In some embodiments, the roughness of the surface 110s2 of the base substrate 110 may be less than the roughness of the non-light coupling region RG2. In some embodiments, the mean roughness depth of the surface 110s2 of the base substrate 110 may be less than mean roughness depth of the non-light coupling region RG2. In some embodiments, a difference between the roughnesses of the light coupling region RG1 and the surface 110s2 of the base substrate 110 is less than a difference between the roughnesses of the light coupling region RG1 and the non-light coupling region RG2.

In the embodiment shown in FIG. 1B, the light coupling region RG1 (or the surface 120s1) and the non-light coupling region RG2 (or the surface 110s1) are formed by different operations, including a chemical operation, such as an etching operation, and a mechanical operation, such as a cutting operation, which will be described later, resulting in the light coupling region RG1 and the non-light coupling region RG2 having different roughnesses. The roughness of the exposed surface 122s1 of the optical channel 122 may greatly impact the efficiency of light coupling, making the light coupling region RG1 less rough improves its efficiency. In a comparative example, the light coupling region and the non-light coupling region are formed by a single step, such as a cutting operation, which may produce a rougher light coupling region, and thus adversely affect the efficiency of light coupling. In the present disclosure, a singluation operation comprising a chemical operation at a first stage and a mechanical operation at a second stage. During the chemical operation (such as an etching operation), the cladding layer and the optical channel on the cutting street (see FIGS. 8A and 8B) are removed to form the recess R and the light coupling region RG1; during the cutting operation, the remaining portion (e.g., the base substrate 110) on the cutting street is removed to separate adjacent photonic components and the non-light coupling region RG2 is formed. The chemical operation (such as an etching operation) is beneficial to form a relatively smooth surface and thus can greatly improve the efficiency of light coupling. On the other hand, the mechanical operation (such as a cutting operation) is less expensive and faster than the chemical operation and thus can increase the production rate. The resulting optoelectronic package has been found to have a superior light coupling efficiency. In the present disclosure, the light coupling region (composed of the optical channel 122 and cladding layer 124) and the non-light coupling region (composed of the base substrate 110) are removed by different operations such that the light coupling region and the non-light coupling region may be non-coplanar and have different roughnesses, which not only enhance the efficiency of light coupling but also be less expensive and time-consuming in terms of manufacturing the optoelectronic package 100a.

Figure 2:
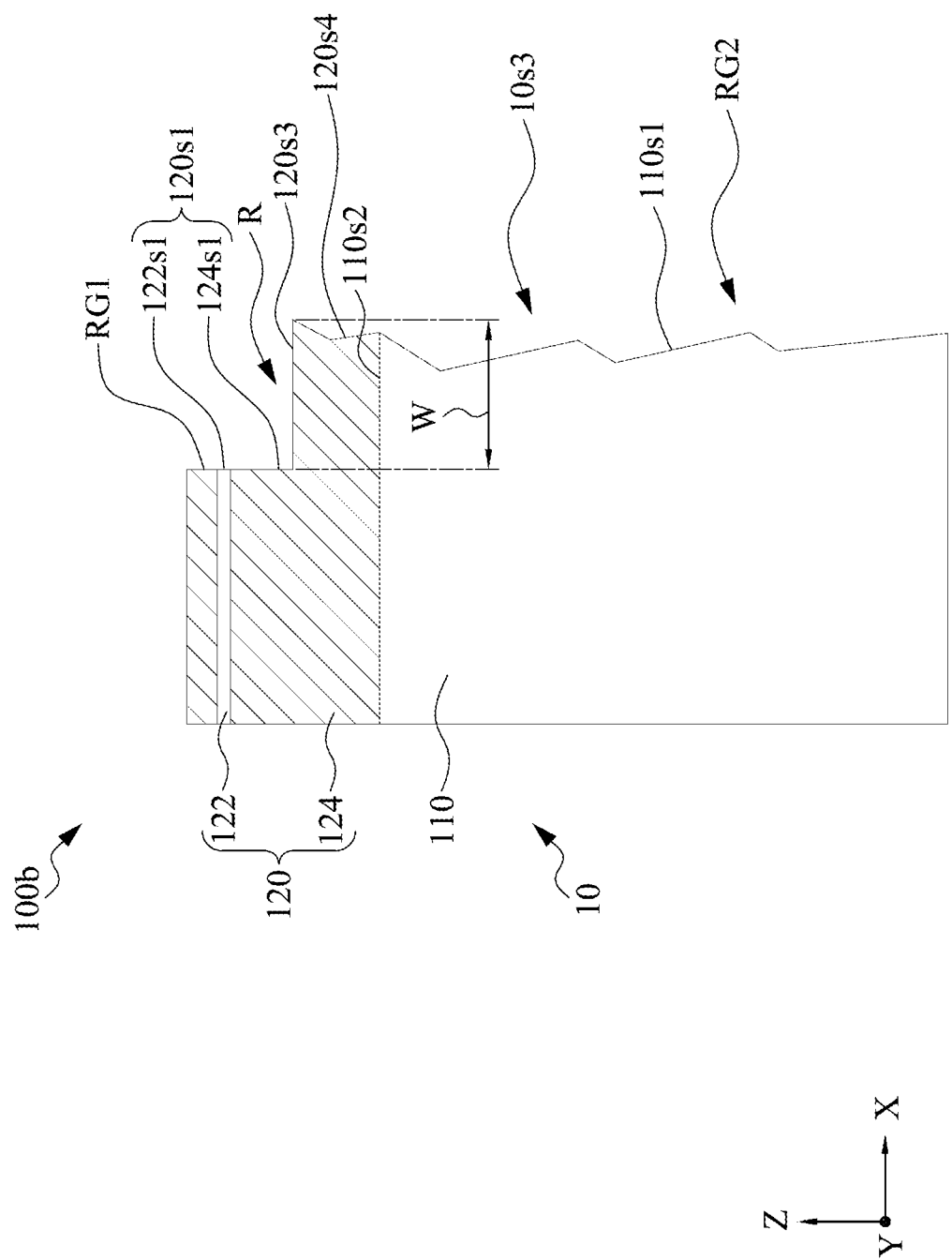
FIG. 2 illustrates a partial enlarged cross-sectional view of an example of an optoelectronic package according to some embodiments of the present disclosure.

FIG. 2 illustrates a partial enlarged cross-sectional view of an example of an optoelectronic package 100b according to some embodiments of the present disclosure. The optoelectronic package 100b of FIG. 2 has a structure similar to that of the optoelectronic package 100a of FIG. 1B while differing in that a portion of the cladding layer 124 is substantially coplanar with the base substrate 110.

In some embodiments, the light coupling structure 120 may further have a surface 120s3 (i.e., an upper surface of the cladding layer 124 exposed from the recess R) and a surface 120s4 (or a lateral surface). The surface 120s3 may extend between the surface 120s1 and the surface 120s4. The surface 120s1 and the surface 120s4 of the light coupling structure 120 are non-coplanar. In some embodiments, the surface 120s4 of the light coupling structure 120 may be substantially coplanar with the surface 110s1 of the base substrate 110. In some embodiments, the surface 120s1, composed of lateral surfaces (122s1 and 124s1) of the optical channel 122 and the cladding layer 124, may have a roughness less than the surface 120s4 composed of the cladding layer 124. In some embodiments, the surface 120s1, composed of lateral surfaces (122s1 and 124s1) of the optical channel 122 and the cladding layer 124, may have a mean roughness depth less than the surface 120s4 composed of the cladding layer 124. In some embodiments, the surface 120s3 composed of the cladding layer 124 may have a roughness less than the surface 120s4 composed of the cladding layer 124. In some embodiments, the surface 120s3 composed of the cladding layer 124 may have a mean roughness depth less than the surface 120s4 composed of the cladding layer 124. In some embodiments, the recess R is defined by the surface 120s1 and the surface 120s3 of the light coupling structure 120, and the surface 120s3 of the light coupling structure 120 may serve as a bottom of the recess R.

In some conditions, not all of the cladding layer 124 is regarded as the light coupling region RG1. In some embodiments, a portion of the lateral surface of the cladding layer 124 near the optical channel 122 may be regarded as a portion of the light coupling region RG1, and the other portion of the lateral surface of the cladding layer 124 may be regarded a portion of the non-light coupling region RG2. In this embodiment, the non-light coupling region RG2 may include or be composed of the surface 120s4 and the surface 110s1.

In this embodiment, the light coupling region RG1 (composed of the optical channel 122 and a portion of the cladding layer 124) and the non-light coupling region RG2 (composed of a portion of the cladding layer 124 and the base substrate 110) are removed by different operations such that the light coupling region RG1 and the non-light coupling region RG2 may be non-coplanar and have different roughnesses, which may enhance the efficiency of light coupling while incurring less cost and cycle time in manufacturing the optoelectronic package 100b.

Figure 3A:
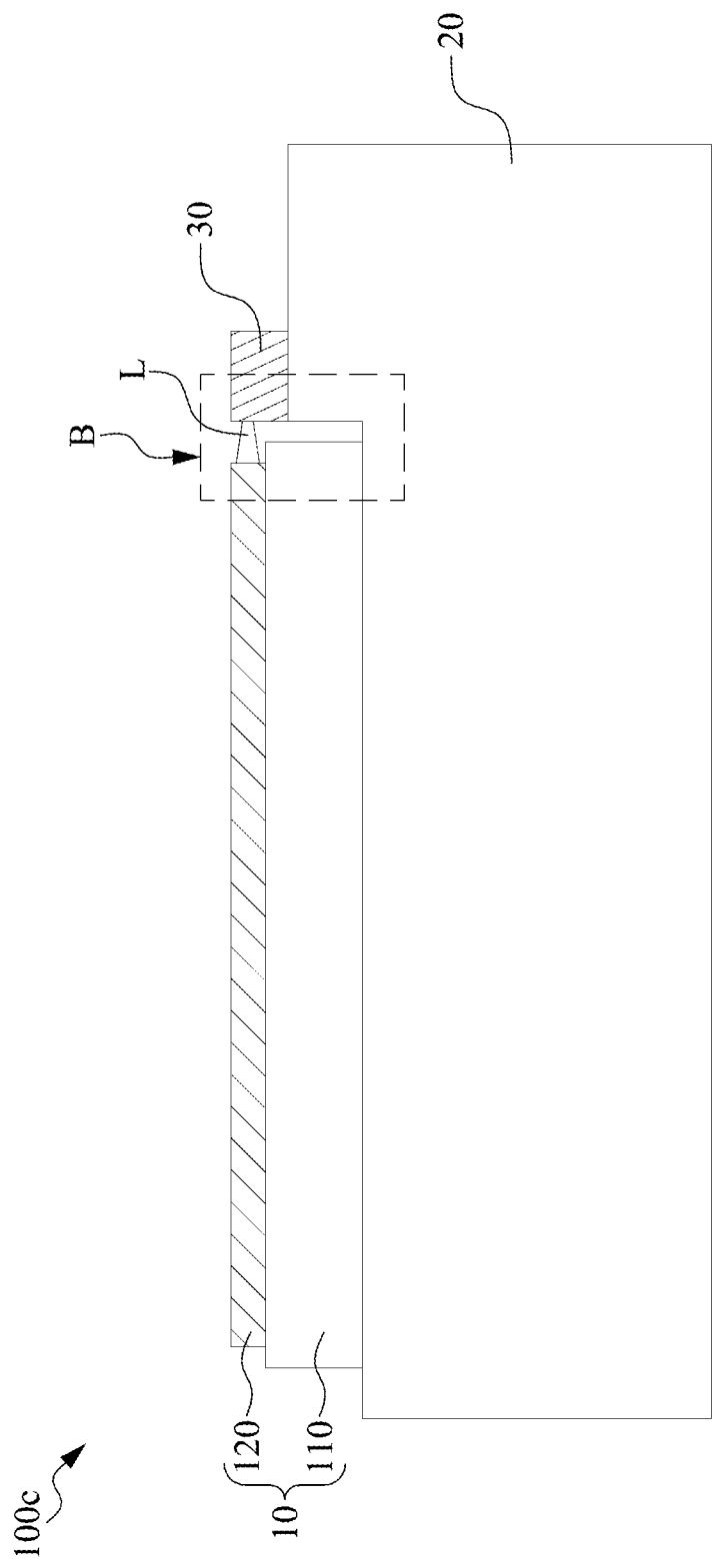
FIG. 3A illustrates a cross-sectional view of an example of an optoelectronic package according to some embodiments of the present disclosure.

FIG. 3A illustrates a cross-sectional view of an example of an optoelectronic package 100c according to some embodiments of the present disclosure. The optoelectronic package 100c of FIG. 3A has a structure similar to that of the optoelectronic package 100a of FIG. 1A while differing in that the optoelectronic package 100c further includes a supportive component 20 (or a carrier) and an optical component 30.

The supportive component 20 may be configured to support the photonic component 10 and the optical component 30. The supportive component 20 may include an organic substrate (e.g., Prepreg (PP), Ajinomoto build-up film (ABF) or other suitable material), a semiconductor substrate (e.g., silicon (Si), germanium (Ge) or other suitable material) or other suitable materials. The supportive component 20 may include active elements, passive elements and conductive traces embedded therein. In some embodiments, the supportive component 20 may include an interposer, a Fan-out Substrate, a package structure or other suitable structures.

The optical component 30 may be disposed on the supportive component 20. The optical component 30 may be configured to provide optical signals to the light coupling structure 120 of the photonic component 10 or to receive optical signals therefrom. In some embodiments, the optical component 30 may include an optical fiber, optical fiber array unit or other suitable elements. In some embodiments, the optical component 30 may include an optical fiber (or fiber array unit) surrounded by a housing. In some embodiments, the optical component 30 may include a laser diode (LD).

Figure 3B:
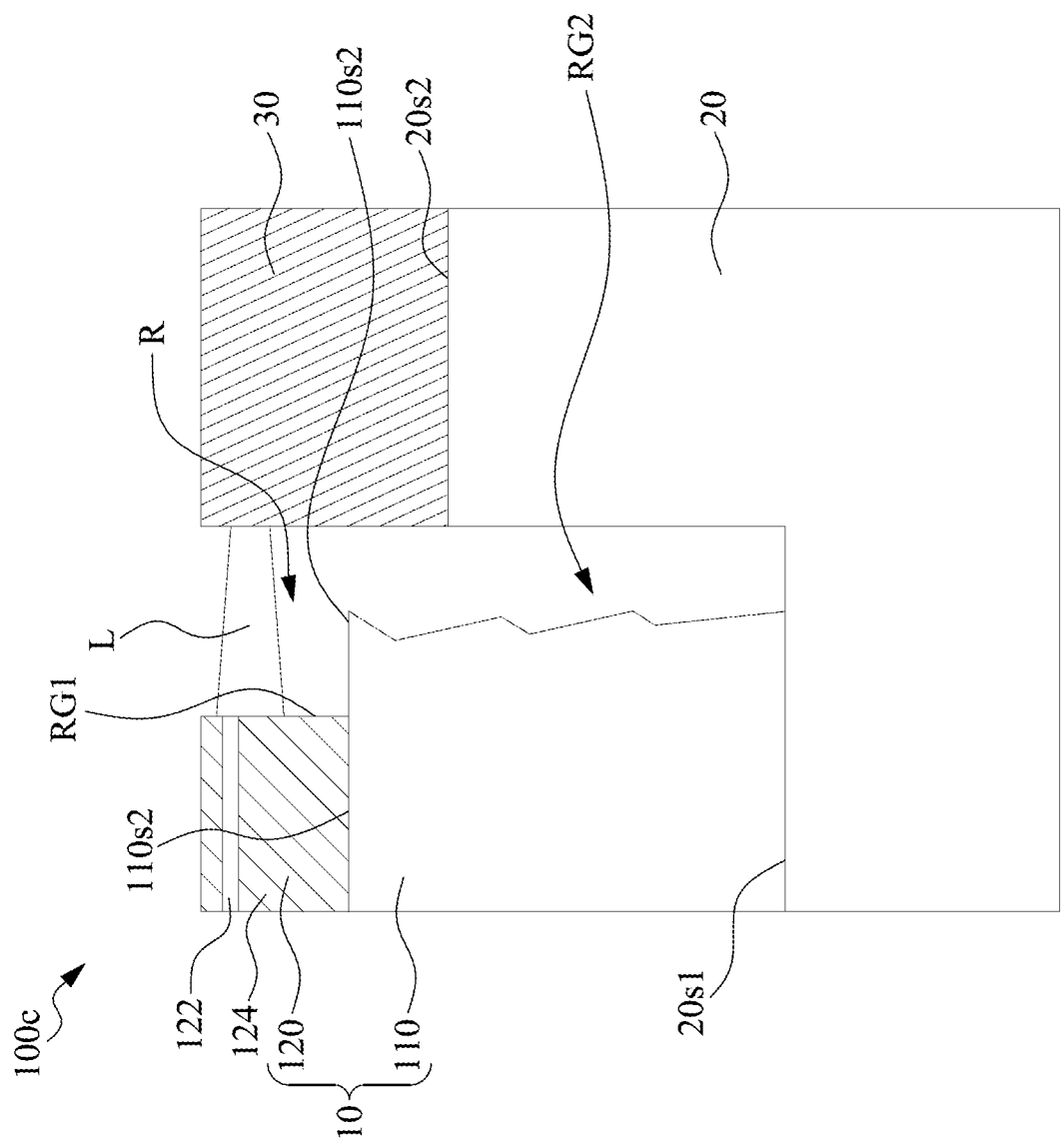
FIG. 3B illustrates a partial enlarged view of an example of the optoelectronic package of FIG. 2A according to some embodiments of the present disclosure.
Figure 3C:
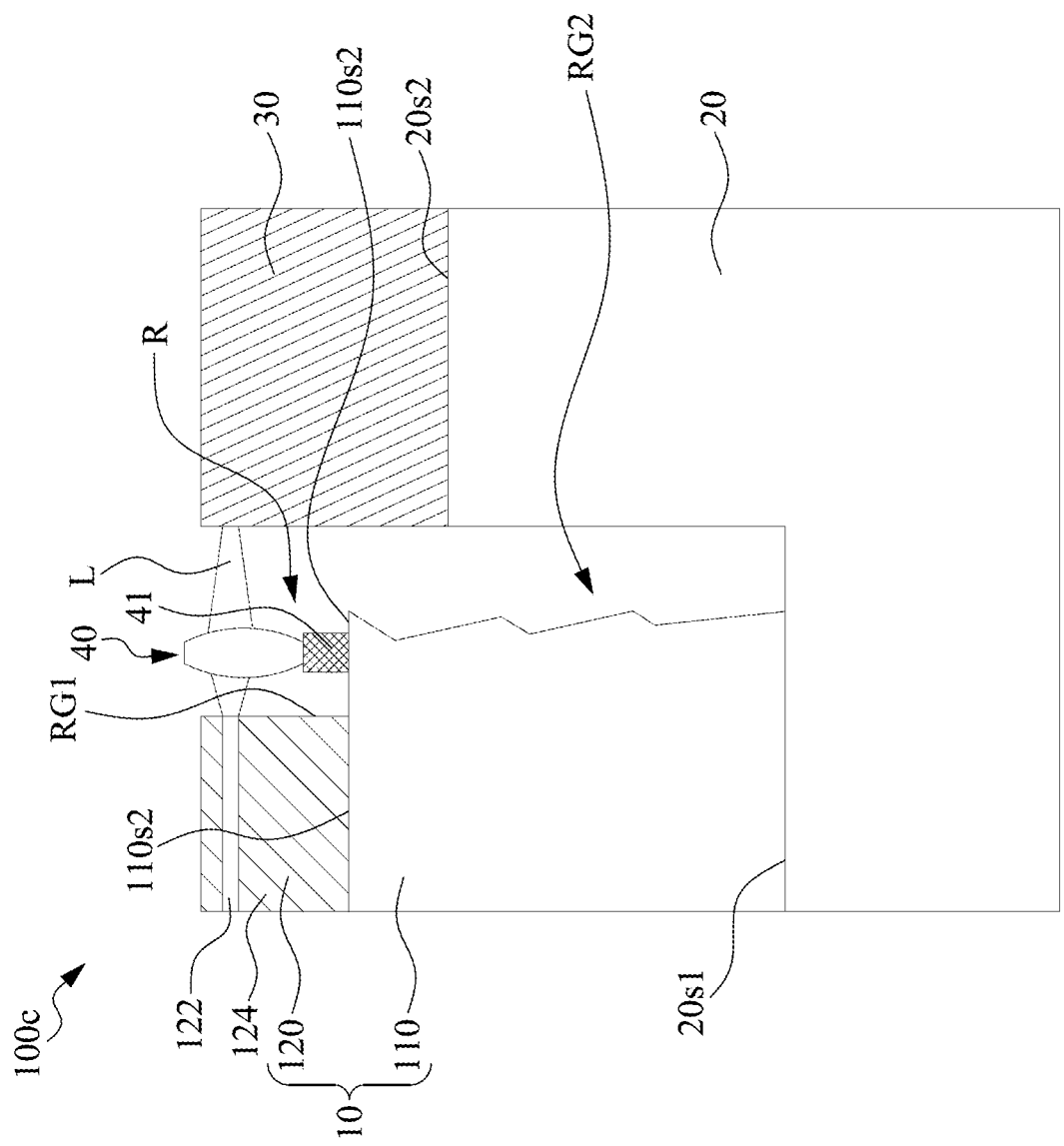
FIG. 3C illustrates a partial enlarged view of an example of the optoelectronic package of FIG. 2A according to some other embodiments of the present disclosure.

FIG. 3B and FIG. 3C illustrates a partial enlarged view of region B of the optoelectronic package of FIG. 3A according to some embodiments of the present disclosure.

The supportive component 20 may have a surface 20s1 (or an upper surface) and a surface 20s2 (or an upper surface) located at different elevations. The surface 20s2 may have an elevation higher than that of the surface 20s1. In some embodiments, the surface 20s2 of the supportive component 20 may have an elevation lower than an elevation of the surface 110s2 of the base substrate 110. In some embodiments, the surface 20s2 of the supportive component 20 may have an elevation lower than the top of the non-light coupling region RG2. The photonic component 10 may be disposed on the surface 20s1 of the supportive component 20. The optical component 30 may be disposed on the surface 20s2 of the supportive component 20. The height of the surface 20s2 can be adjusted such that the optical component 30 can be optically coupled with the light coupling structure 120 (or the light coupling region RG1) more precisely.

The optical component 30 is optically coupled with the light coupling structure 120 (or the light coupling region RG1) of the photonic component 10. The optical component 30 may emit optical signal L to the light coupling region RG1 of the photonic component 10 or receive optical signal from the light coupling region RG1.

In some embodiments, the optoelectronic package 100c may further include an optical element 40 as illustrated in FIG. 3C. In some embodiments, the optical element 40 may be configured to enhance the efficiency of light coupling. In some embodiments, the optical element 40 may be configured to collimate optical signals. In some embodiments, the optical element 40 may optically couple with the light coupling region RG1. In some embodiments, the optical element 40 may be disposed on a bottom surface of the recess R (i.e., the surface 110s2 exposed from the recess R) and may cover the surface 124s1 of the optical channel. In some embodiments, the optical element 40 may include a lens or other suitable optical elements. In some embodiments, the optoelectronic package 100c may further include a supporter 41. The supporter 41 may be disposed between the optical element 40 and the surface 110s2 of the base substrate 110. The supporter 41 may include an adhesive. In some embodiments, the optical element 40 may be disposed on the supporter 41 by a transport feature (not shown), e.g., a pick-and-place machine. In some embodiments, after the optical element 40 is aligned to the light coupling region RG1, the adhesive may be cured, and then the transport feature may be removed. In some embodiments, the supporter 41 may be a protruding portion, with an adhesive thereon, of the base substrate 110.

In some embodiments of the present disclosure, the light coupling region RG1 (composed of the optical channel 122 and cladding layer 124) and the non-light coupling region RG2 (composed of the base substrate 110) are removed by different operations such that the light coupling region RG1 and the non-light coupling region RG2 may be non-coplanar and have different roughnesses, which may enhance the efficiency of light coupling while incurring less cost and cycle time in manufacturing the optoelectronic package 100c.

It should be noted that the optoelectronic package 100b as shown in FIG. 2 may further include the supportive component 20, the optical component 30, and the optical element 40. In such embodiment, the optical element 40 may be disposed on a bottom surface of the recess R (i.e., the surface 120s3 of the light coupling structure 120 exposed from the recess R).

Figure 4:
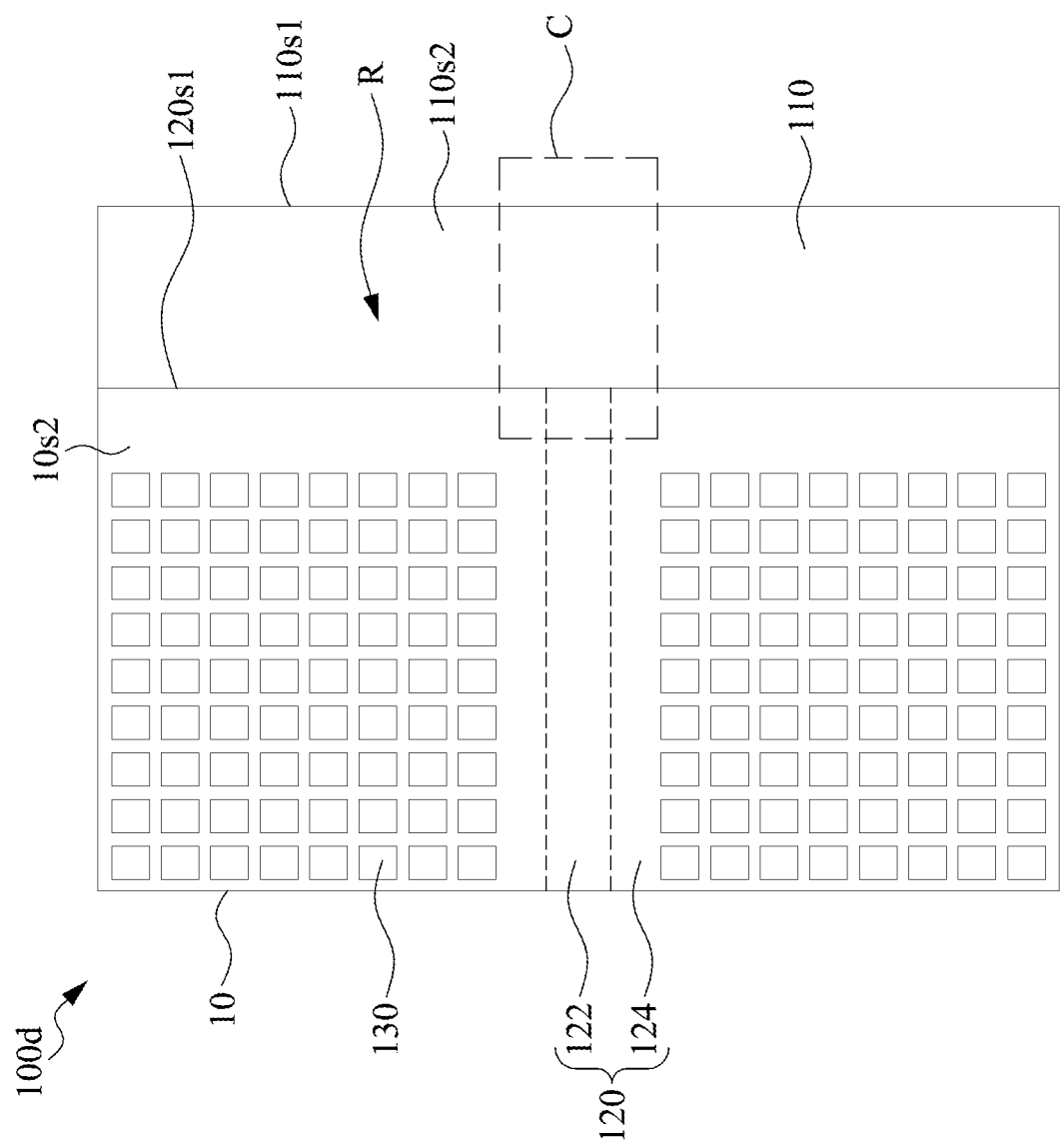
FIG. 4 illustrates a top view of an example of an optoelectronic package according to some embodiments of the present disclosure.

FIG. 4 illustrates a top view of an example of an optoelectronic package 100d according to some embodiments of the present disclosure.

In some embodiments, the photonic component 10 further includes a plurality of metal pads or metal mesh 130. The metal mesh 130 may be beneficial to balance the stress of the photonic component 10. The metal mesh 130 may be subjected to a plating process to form a metal pattern thereon. The metal pads 130 may be disposed at the surface 10s2 of the photonic component 10. In some embodiments, the surface 10s2 of the photonic component 10 is formed by the cladding layer 124. In some embodiments, the metal pads 130 may be embedded in the cladding layer 124 of the light coupling structure 120. The metal pads 130 may be covered by the cladding layer 124 of the light coupling structure 120. For example, the cladding layer 124 may cover a peripheral portion of an upper surface of the metal pad 130 and expose a central portion of an upper surface of the metal pad 13 for electrical connection with other component or electrical circuit. In some embodiments, the metal pads 130 may be spaced apart from the surface 110$s$1 of the base substrate 110. In some embodiments, the metal pads 130 may be spaced apart from the surface 120$s$1 of the light coupling structure 120. In some embodiments, a passivation layer (not shown) may be disposed on the surface 10$s$2 of the photonic component 10 and surround the metal pads 130. In some embodiments, the passivation layer may include an oxide, nitride, solder material or other suitable materials. The material of the passivation layer may be the same as or different from the material of the cladding layer 124.

In the embodiments illustrated in FIG. 4, the metal pads 130 are disposed at a region spaced apart from a cutting street CS for use in a cutting operation (also refer to FIG. 8C) and the recess R. Consequently, a singulation operation may be performed without removing any of the metal pads or metal mesh 130. In a comparative example, a portion of the metal pads or metal mesh 130 is disposed on or overlaps the cutting street CS. In such example, a laser may be used to remove the portion of the metal pads or metal mesh 130 along the cutting street CS to form a groove, after which a cutting operation is performed from the groove. However, laser may burn the cladding layer 124 of the light coupling region and affect the efficiency of light coupling. In the embodiments according to the present disclosure, the metal pads (or metal mesh) 130 are spaced apart from the cutting street CS and the recess R, which is beneficial to the cutting operation as well as the operation for forming the recess R.

Figure 5:
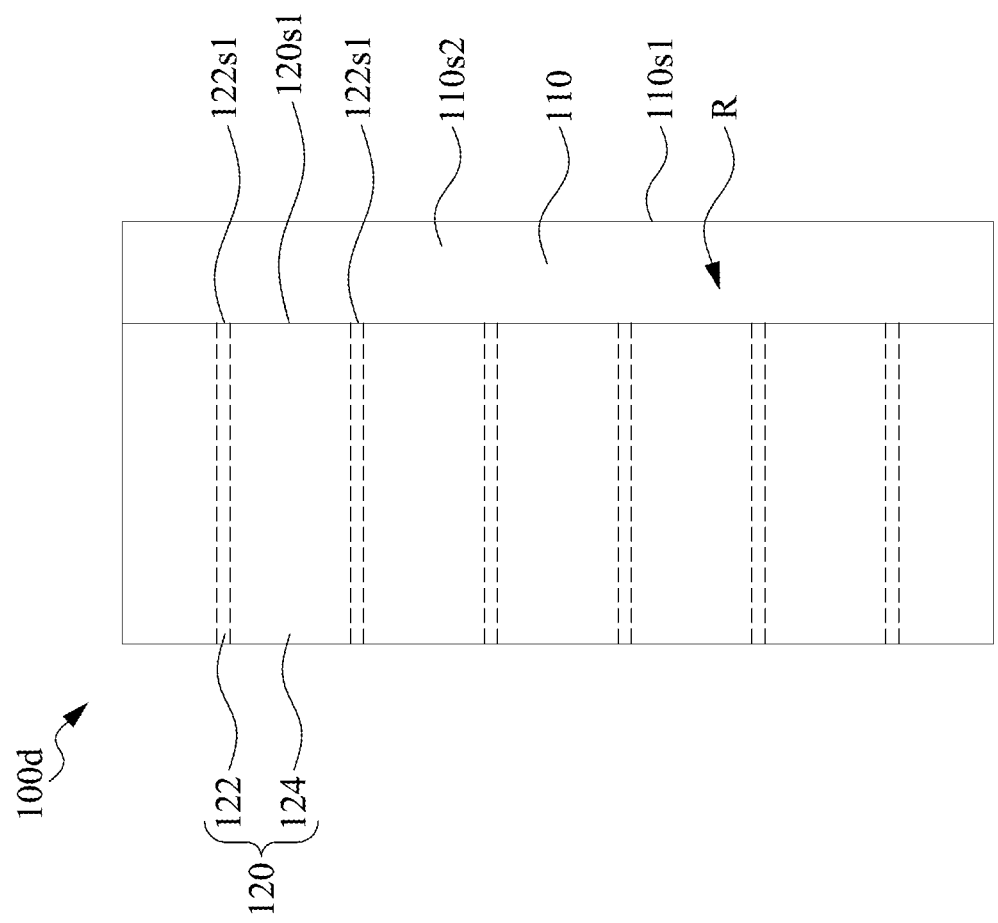
FIG. 5 illustrates a partial enlarged view of an example of the optoelectronic package of FIG. 4 according to some embodiments of the present disclosure.

FIG. 5 illustrates a partial enlarged view of region C of the optoelectronic package 100$d$ of FIG. 4 according to some embodiments of the present disclosure.

In some embodiments, the light coupling structure 120 may include a plurality of optical channels 122 separated from each other by the cladding layer 124. Each of the optical channel 122 may have a surface 122$s$1 (or a lateral surface) exposed from the recess R (i.e., a sidewall of the recess R or the lateral surface 120$s$1 of the light coupling structure 120). In some embodiments, the surfaces 122$s$1 of the optical channel 122 may be substantially coplanar to each other. In some embodiments, the surfaces 122$s$1 of the optical channel 122 may be substantially coplanar to the lateral surface 120$s$1 of the light coupling structure 120.

Figure 6:
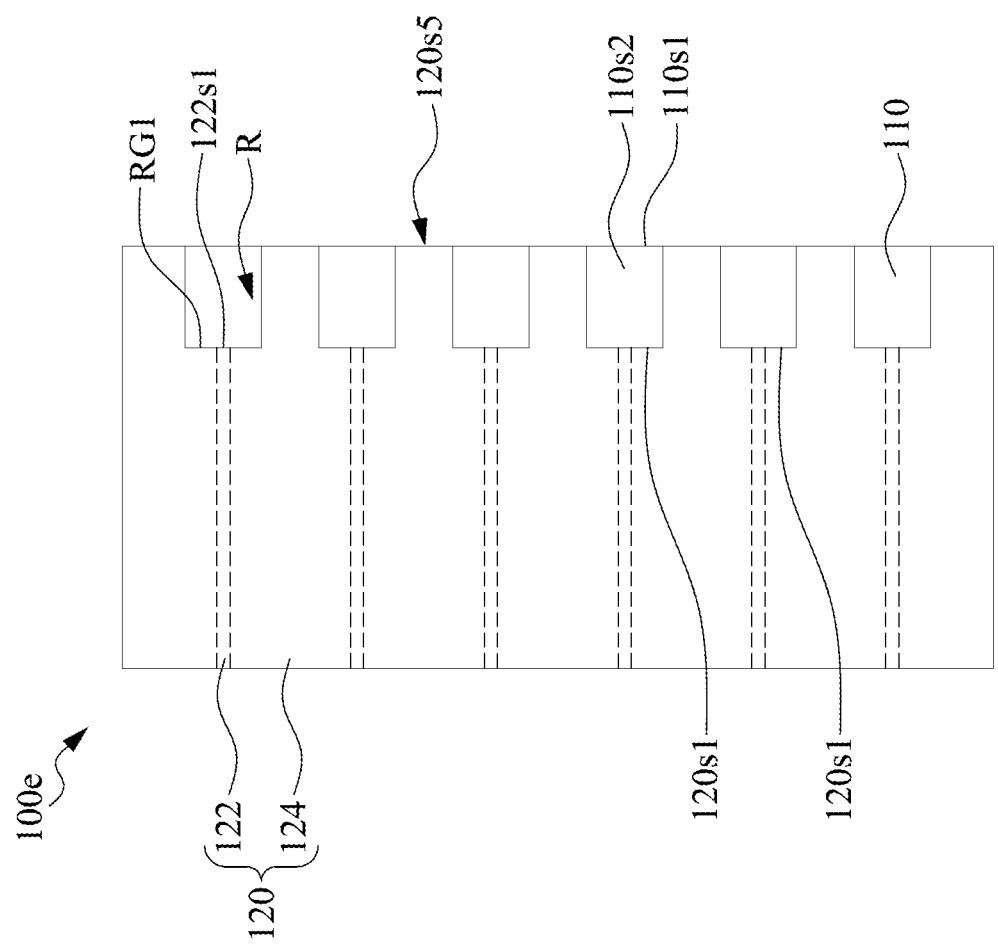
FIG. 6 illustrates a top view of an example of an optoelectronic package according to some embodiments of the present disclosure.

FIG. 6 illustrates a top view of an example of an optoelectronic package 100$e$ according to some embodiments of the present disclosure. The optoelectronic package 100$e$ of FIG. 6 has a structure similar to that of the optoelectronic package 100$d$ of FIG. 5 while differing in that the optoelectronic package 100$e$ may include a plurality of recesses R.

In some embodiments, the plurality of recesses R are separated from each other by the cladding layer 124. In some embodiments, the light coupling region RG1 may be located at each of the plurality of recesses R. In some embodiments, each of the surfaces 122$s$1 of the optical channels 122 is exposed from a respective one of the plurality of recesses R.

In some embodiments, the light coupling structure 120 may have a surface 120$s$5 (or a lateral surface). The surface 120$s$5 and the surface 120$s$1 (a lateral surface) of the light coupling structure 120 are non-coplanar. The surface 120$s$5 of the light coupling structure 120 is located at the non-light coupling region RG2 while the surface 120$s$1 of the light coupling structure 120 is located at the light coupling region RG1. In some embodiments, the surface 120$s$5 of the light coupling structure 120 may be substantially coplanar with the surface 110$s$1 (a lateral surface) of the base substrate 110. The surface 110$s$2 (an upper surface) of the base substrate 110 may extend between the surface 120$s$1 and the surface 120$s$5 of the light coupling structure 120 and constitutes a bottom surface of the corresponding recess R. In some embodiments, the roughness of the surface 120$s$5 of the light coupling structure 120 may be different from that of the surface 120$s$1 of the light coupling structure 120. In some embodiments, the roughness of the surface 120$s$5 of the light coupling structure 120 may be greater than that of the surface 120$s$1 of the light coupling structure 120. In some embodiments, a difference between the roughnesses of the surface 110$s$1 of the base substrate 110 and the surface 120$s$5 of the light coupling structure 120 is less than a difference between the surface 120$s$1 of the light coupling structure 120 and the surface 120$s$5 of the light coupling structure 120.

Figure 7:
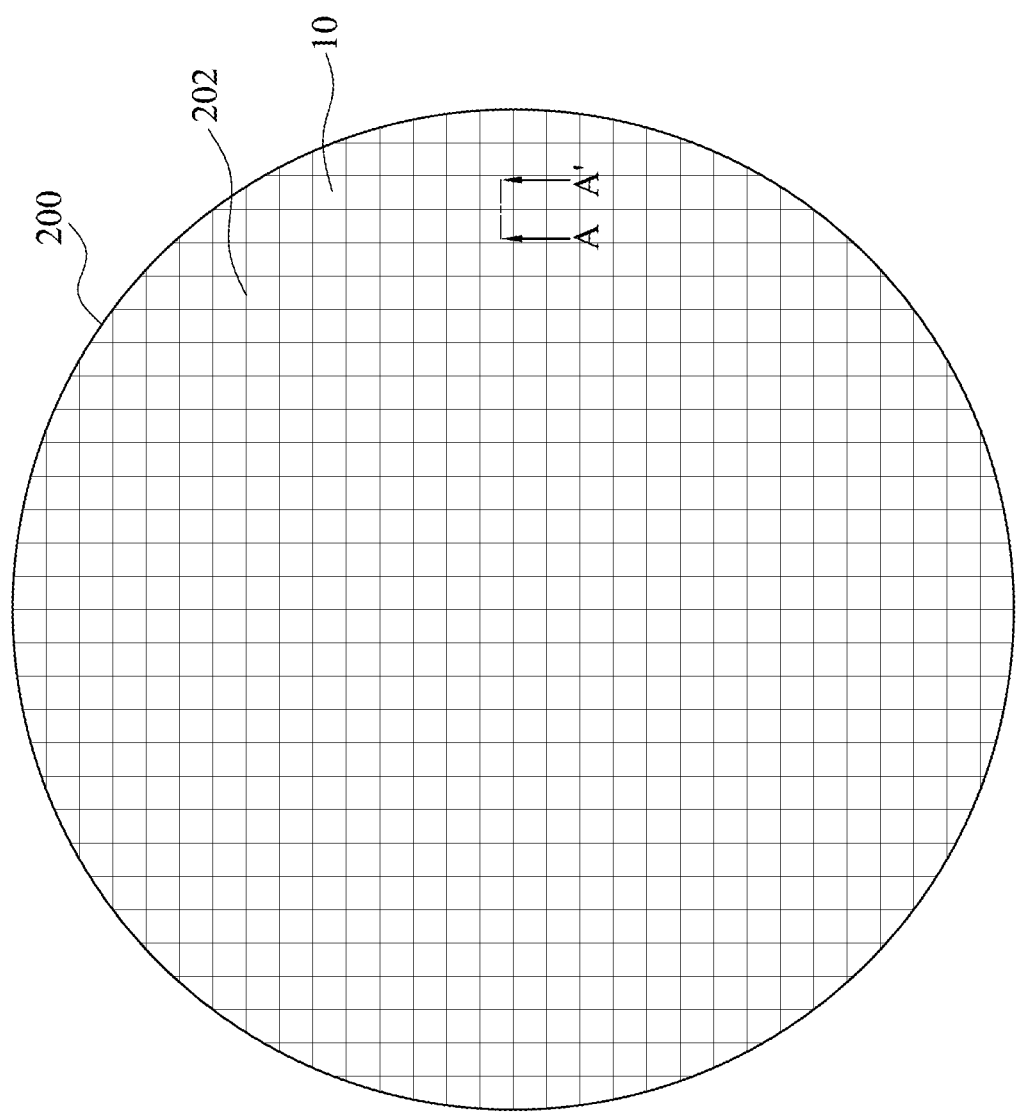
FIG. 7 illustrates a top view of an example of a semiconductor structure according to some embodiments of the present disclosure.

FIG. 7 illustrates a top view of an example of a semiconductor structure 200 according to some embodiments of the present disclosure.

The semiconductor structure 200 may include a plurality of photonic components 10. A plurality of cutting streets 202 may be disposed between the plurality of photonic components 10. The cutting street 202 may be a region on which a singulation operation is performed, such as a chemical operation, mechanical operation or other suitable operation. After the singulation operation is performed, the plurality of photonic components 10 may be separated from each other.

Figure 8A:
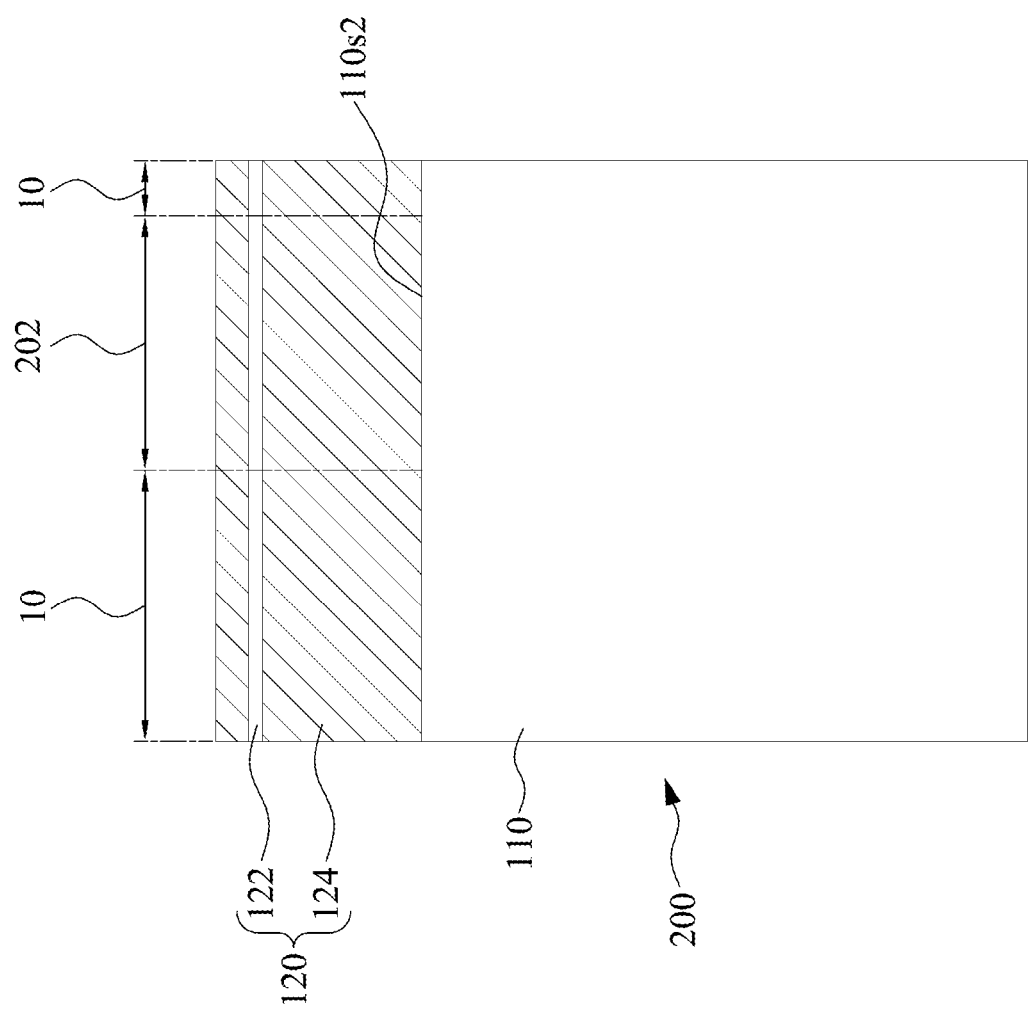
FIGS. 8A, 8B, and 8C illustrate various stages of an example of a method for manufacturing an optoelectronic package according to some embodiments of the present disclosure.
Figure 8B:
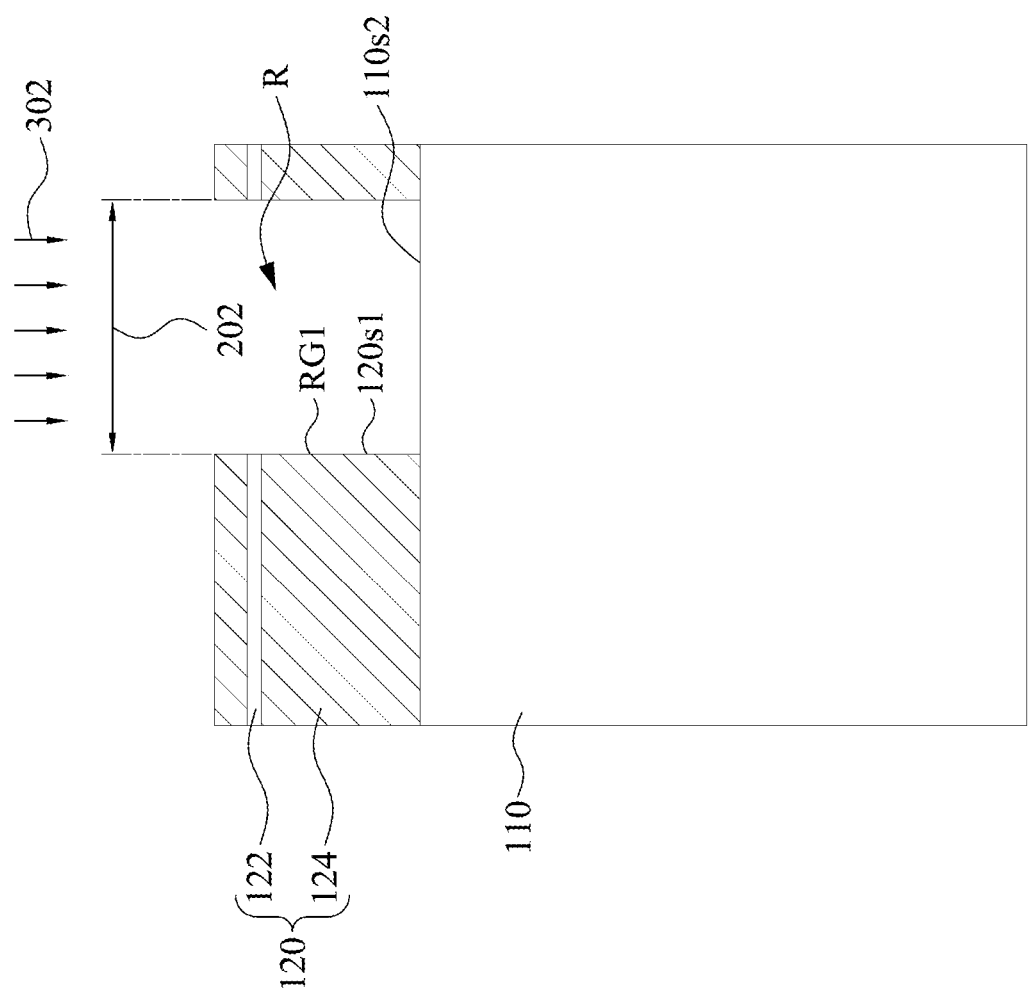
Figure 8C:
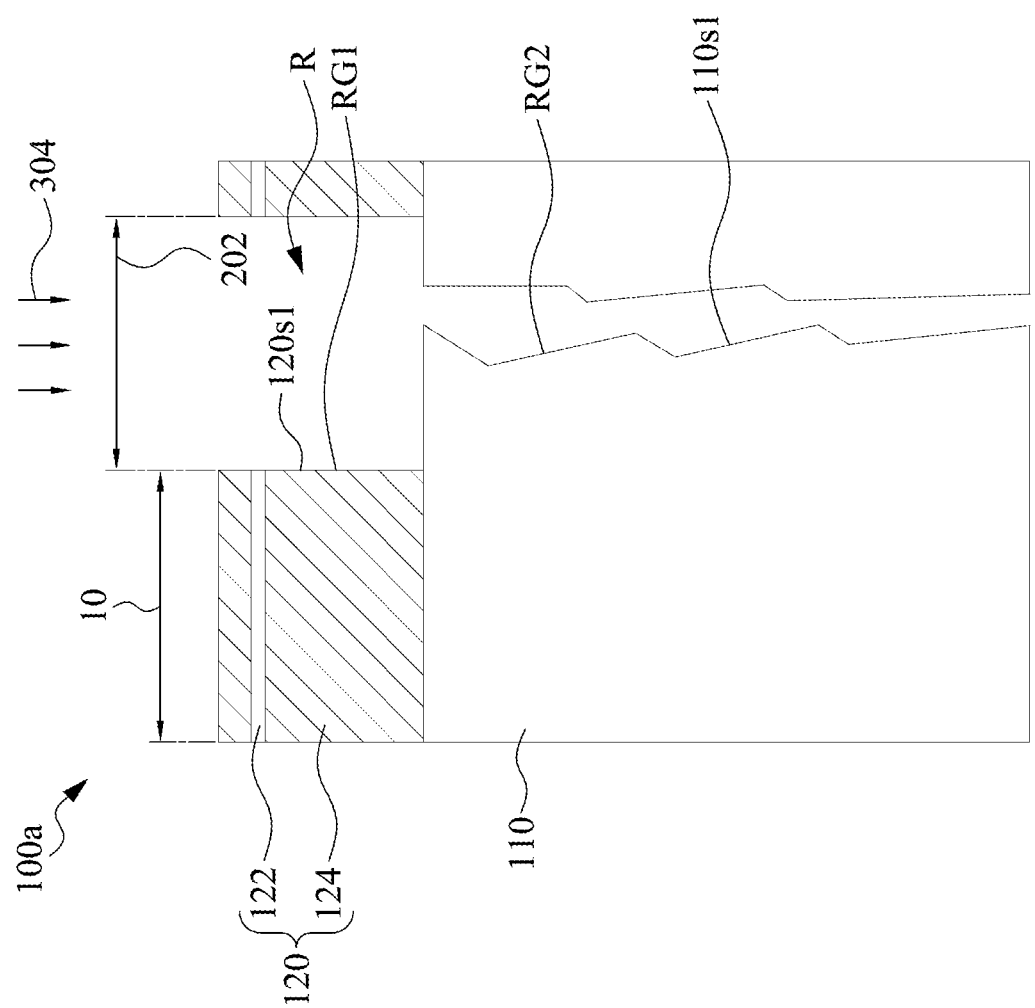

FIGS. 8A, 8B, and 8C illustrate various stages of an example of a method for manufacturing an optoelectronic package 100$a$ according to some embodiments of the present disclosure. More specifically, FIGS. 8A, 8B, and 8C illustrate cross-section views of the line A-A' of the semiconductor structure 200 shown in FIG. 7 at different stages.

Referring to FIG. 8A, a semiconductor structure 200 is provided. The semiconductor structure 200 may include a base substrate 110 and a light coupling structure 120. The semiconductor structure 200 may include a plurality of photonic components 10 separated by a cutting street 202. The light coupling structure 120 is disposed adjacent to or on a surface 110$s$2 of the base substrate 110. The light coupling structure 120 may include an optical channel 122 and a cladding layer 124. The optical channel 122 may be embedded in the cladding layer 124.

Referring to FIG. 8B, a removing operation 302 is performed on the cutting street 202 to remove the optical channel 122 and the cladding layer 124 of the light coupling structure 120 from the cutting street to form a recess R. As a result, the surface 110$s$2 of the base substrate 110 may be exposed from the recess R. Further, a surface 120$s$1, including lateral surfaces of the optical channel 122 and the cladding layer 124, may be formed and constitute a light coupling region RG1. The surface 120$s$1 may be defined as light coupling region RG1. In some embodiments, the removing operation 302 may include a chemical operation. The chemical operation may include an etching operation, such as a deep reactive ion etching (DRIE) operation, a wet etching operation or other suitable operations, or a combination thereof. The wet etching operation has a high etching rate and is beneficial for removing oxides. In some embodiments, performing the removing operation 302 may include using an etchant that can etch the materials of the optical channel 122 and the cladding layer 124. The etchant may include, for example, hydrofluoric acid, hydrochloric acid, ammonium fluoride, or a combination thereof or other suitable components. In some embodiments, the etchant may be a solution containing hydrofluoric acid. In some embodiments, the etchant may include hydrofluoric acid and water, hydrofluoric acid and ammonium fluoride, or hydrofluoric acid and hydrochloric acid. In some other embodiments, a small portion of the base substrate 110 may be removed during the removing operation 302, and the surface 110s2 of the base substrate 110 may be concaved toward the base substrate 110. The chemical operation, such as a DRIE operation or wet etching operation, may assist in forming a relatively smooth surface. Consequently, the surface 110s2 of the base substrate 110 and the surface 120s1 of the light coupling structure 120 may be less rough (i.e., relatively smooth).

Referring to FIG. 8C, a removing operation 304 is performed on the cutting street 202 to remove the base substrate 110 from the cutting street 202 such that the plurality of photonic components 10 are separated and is applicable to form optoelectronic packages 100a. In some embodiments, the removing operation 302 may include a mechanical operation. In some embodiments, the removing operation 304 may include a cutting operation or other mechanical operations. The cutting operation may cut through the semiconductor structure 200 from the recess R. A width of the cutting tool (e.g., a blade saw) or a width of the removal portion resulted from the cutting tool is relatively small than a width of the cutting street 202 (or a width of the bottom surface of the recess R). As a result, a surface 110s1, spaced apart from the surface 120s1 of the light coupling structure 120, may be formed. The surface 110s1 of the base substrate 110 constitutes a non-light coupling region RG2 and may be defined as non-light coupling region RG2. The roughness of a surface formed by a mechanical operation (such as a cutting operation) is relatively rough as compared to a surface formed by a chemical operation (such as an etching operation) and may be influenced under a chipping issue. Consequently, the roughness of the surface 110s1 of the base substrate 110 may be greater than that of the surface 120s1 of the light coupling structure 120. In some embodiments, a dicing solution, such as Diamaflow, may be used during the removing operation 304. The components in the dicing solution may adhere to the particles (as silicon particles) resulted during the removing operation 304, keep the particles suspending in the solution and thus can prevent the particles from accumulating at the light coupling region RG1. In some embodiments, the mechanical operation may be carried out by forming a trench to expose a surface of the base substrate 110 and then applying a stress on the trench to separate the photonic components 10.

In the present disclosure, the singluation of the photonic components 10 involves two removing operations, i.e., a chemical operation (such as an etching operation) as a first removing operation and a mechanical operation (such as a cutting operation) as a second removing operation. In the embodiments according to the present disclosure, in the first removing operation the surface 120s1 is formed by a chemical operation, such as a DRIE operation or wet etching operation, and thus the surface 120s1 of the light coupling structure 120 may be less rough (i.e., relatively smooth). As a result, the roughness of the light coupling region RG1 can be relatively small, which improves the efficiency of light coupling. Further, in order to reduce the cost and improve the cycle time, in the second removing operation, a mechanical operation (such as a cutting operation) is performed to separate the photonic components 10 and form the non-light coupling region RG2 of which roughness may not crucial to the efficiency of light coupling. Therefore, the embodiment shown in FIGS. 8A, 8B and 8C provides a method that can produce an optoelectronic package with a high efficiency of light coupling as well as a relatively small cost and cycle time.

Figure 9A:
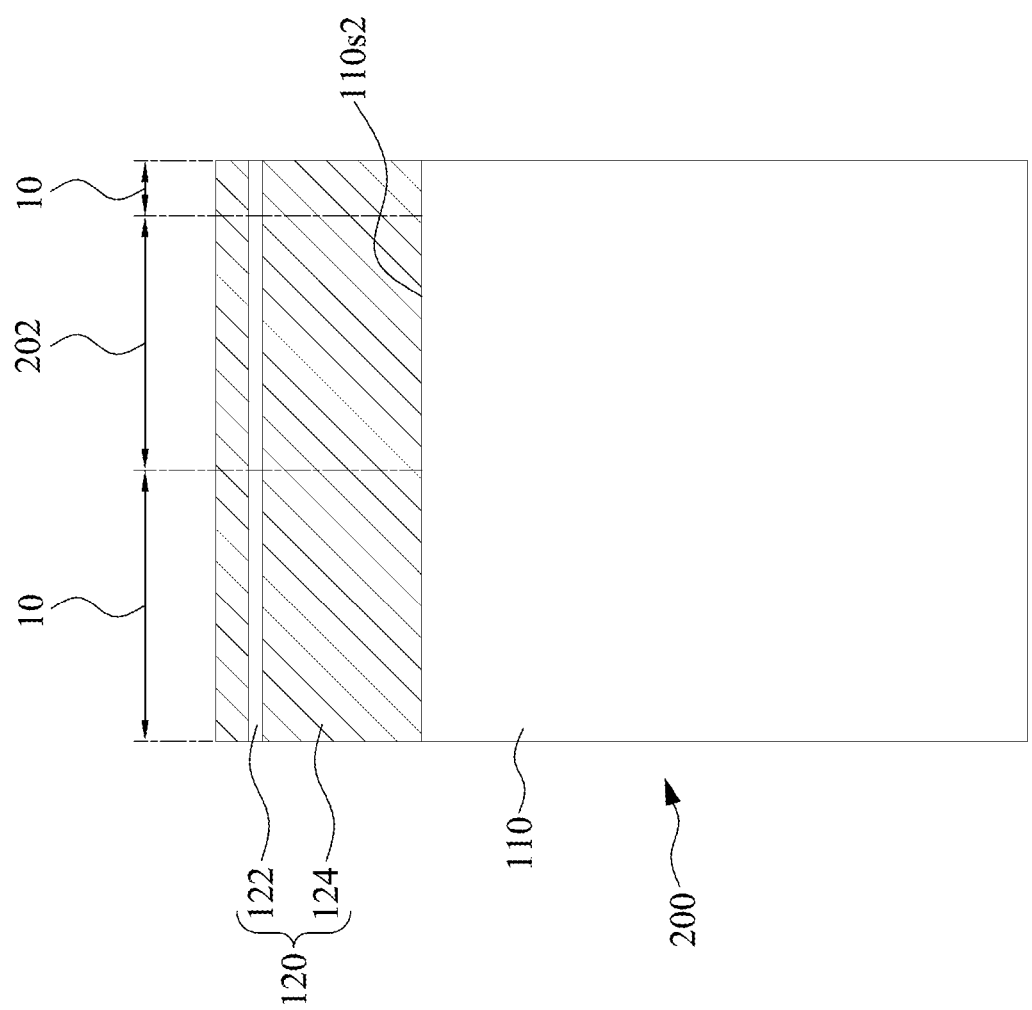
FIGS. 9A, 9B, and 9C illustrate various stages of an example of a method for manufacturing an optoelectronic package according to some embodiments of the present disclosure.
Figure 9B:
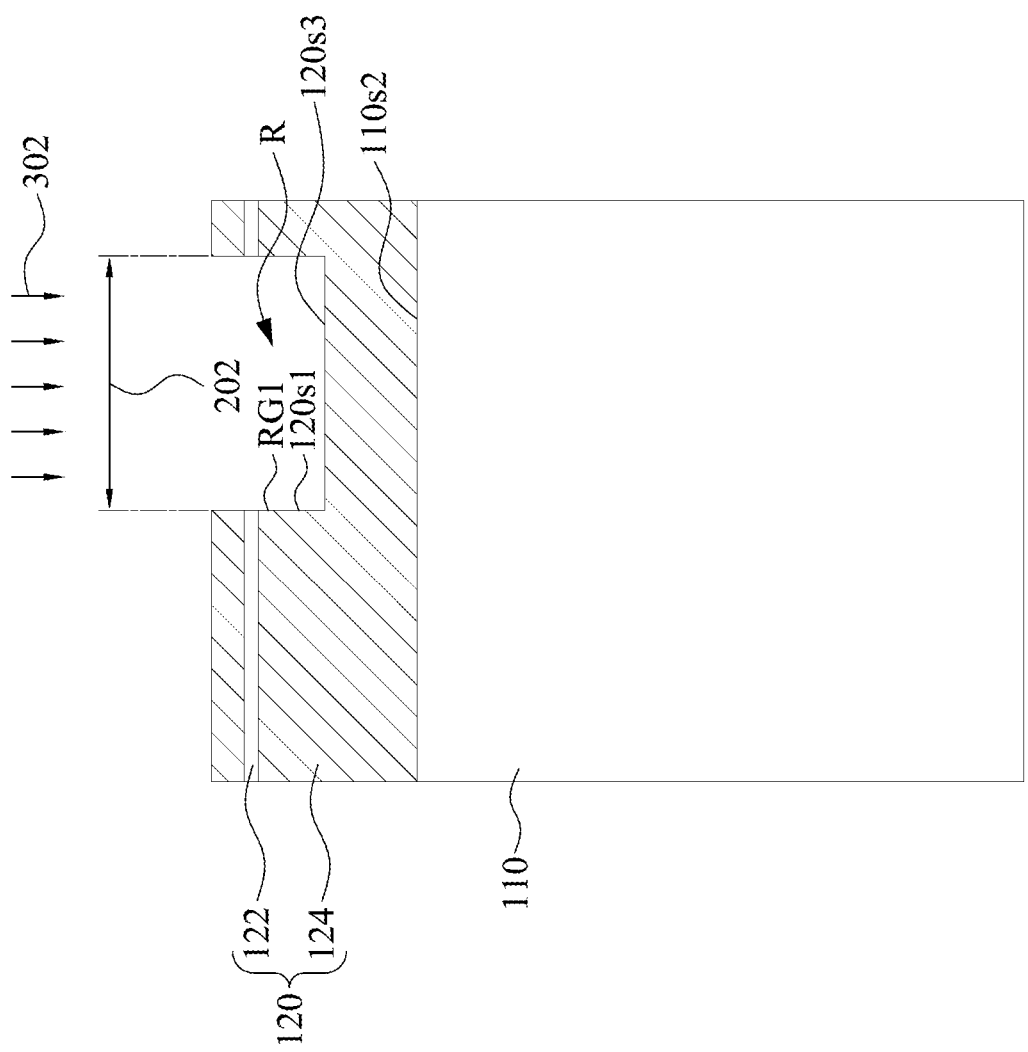
Figure 9C:
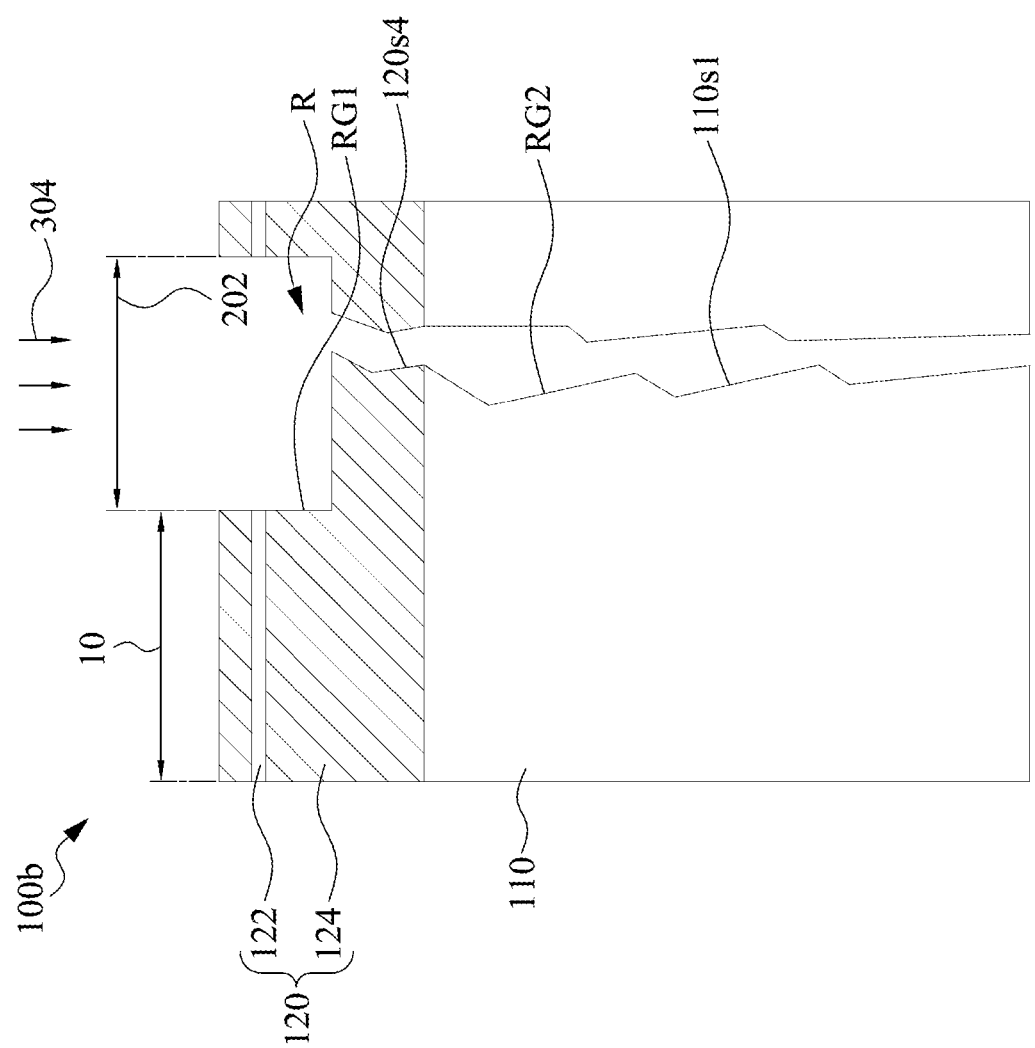

FIGS. 9A, 9B, and 9C illustrate various stages of an example of a method for manufacturing an optoelectronic package 100b according to some embodiments of the present disclosure.

Referring to FIG. 9A, a semiconductor structure 200 is provided. The semiconductor structure 200 may include a base substrate 110 and a light coupling structure 120. The semiconductor structure 200 may include a plurality of photonic components 10 separated by a corresponding cutting street 202. The light coupling structure 120 is disposed adjacent to or on a surface 110s2 of the base substrate 110. The light coupling structure 120 may include an optical channel 122 and a cladding layer 124. The optical channel 122 may be embedded in the cladding layer 124.

Referring to FIG. 9B, a removing operation 302 is performed on the cutting street 202 to remove the optical channel 122 and the cladding layer 124 of the light coupling structure 120 from the cutting street to form a recess R. The cladding layer 124 underneath the optical channel 122 is partially removed. As a result, a surface 120s1 and a surface 120s3 of the light coupling structure 120 are formed after the removing operation 302, and the surface 120s1 of the light coupling structure 120 constitutes a light coupling region RG1. The removing operation 302 may include a chemical operation, such as a DRIE operation, a wet etching operation or other suitable operations, or a combination thereof. The details of the chemical operation are discussed above with respect FIG. 8B. Consequently, the surface 120s1 and the surface 120s3 of the light coupling structure 120 may be less rough (i.e., relatively smooth).

Referring to FIG. 9C, a removing operation 304 is performed on the cutting street 202 to remove the remaining cladding layer 124 and the base substrate 110 from the cutting street 202 such that the plurality of photonic components 10 are separated and is applicable to form optoelectronic packages 100b. A surface 120s4 of the light coupling structure 120 and a surface 110s1 of the base substrate 110 are formed. The surface 120s4 of the light coupling structure 120 and the surface 110s1 of the base substrate 110 constitutes a non-light coupling region RG2 and may be defined non-light coupling region RG2. The roughness of the non-light coupling region RG2 produced by a mechanical operation (such as a cutting operation) is greater than the roughness of the light coupling region RG1 produced by a chemical operation (such as an etching operation). As a result, a plurality of optoelectronic packages 100b are produced. In some embodiments, the removing operation 304 may include a cutting operation. The cutting operation may cut through the semiconductor structure 200 from the recess R. The details of the cutting operation are discussed above with respect FIG. 8C.

In some cases, not all of the lateral surface of the cladding layer 124 serve as the light coupling region RG1. Therefore, the roughness of the cladding layer 124 far from or distal to the optical channel 122 may not crucial to the efficiency of light coupling. In such case, a portion of the cladding layer 124 may be removed by the cutting operation without affecting the efficiency of light coupling.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. Such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optoelectronic package, comprising:
    a photonic component having:
        a bottom surface; and
        a lateral surface comprising a light coupling region and a non-light coupling plane, wherein the non-light coupling plane contacts the bottom surface and wherein the light coupling region and the non-light coupling plane are not aligned,
    wherein the photonic component comprises a carrier and a light coupling structure, the light coupling structure has a lateral surface constituting the light coupling region, and the carrier has a lateral surface constituting the non-light coupling plane,
    and wherein the carrier has an upper surface extending between the lateral surface of the light coupling structure and the lateral surface of the carrier, the non-light coupling plane has a first roughness, and the upper surface of the carrier has a second roughness less than the first roughness of the non-light coupling plane.

2. The optoelectronic package of claim 1, wherein the light coupling region has a third roughness and the first roughness of the non-light coupling plane is greater than the third roughness of the light coupling region.

3. The optoelectronic package of claim 1, wherein the light coupling region is recessed from the lateral surface of the non-light coupling plane.

4. The optoelectronic package of claim 1, wherein the light coupling region has a third roughness, and a difference between the third roughness and the second roughness is less than a difference between the first roughness and the second roughness.

5. The optoelectronic package of claim 1, further comprising:
    an optical element disposed on the upper surface of the carrier.

6. The optoelectronic package of claim 1, further comprising a supportive component configured to support the photonic component and an optical component.

7. The optoelectronic package of claim 6, wherein the optical component is optically coupled with the light coupling region of the photonic components.

8. The optoelectronic package of claim 6, wherein an upper surface of the supportive component has an elevation lower than an elevation of a top of the non-light coupling plane.

9. The optoelectronic package of claim 1, further comprising:
    a plurality of metal pads disposed at an active surface of the photonic component, wherein the plurality of metal pads are spaced apart from the lateral surface of the photonic component.

* * * * *